Oct. 5, 1971   W. H. HOLZBOOG   3,610,061
IDLER DRIVE WHEEL AND THE METHOD OF ITS MANUFACTURE
Filed May 14, 1970   3 Sheets-Sheet 1

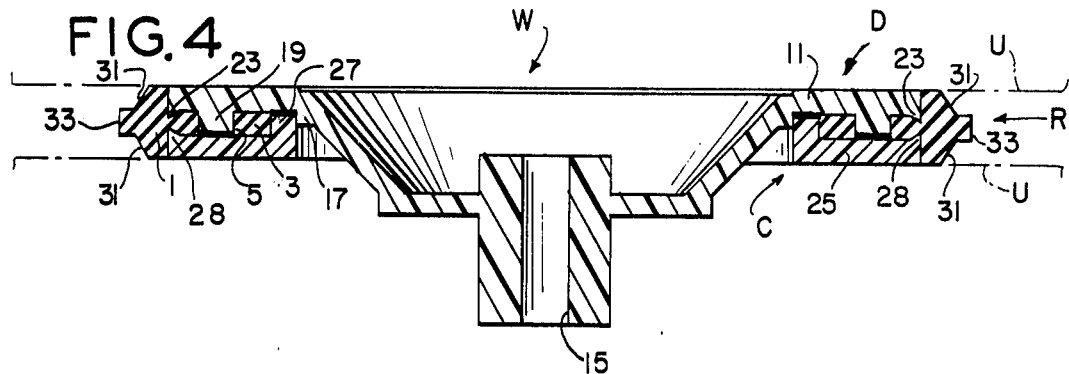
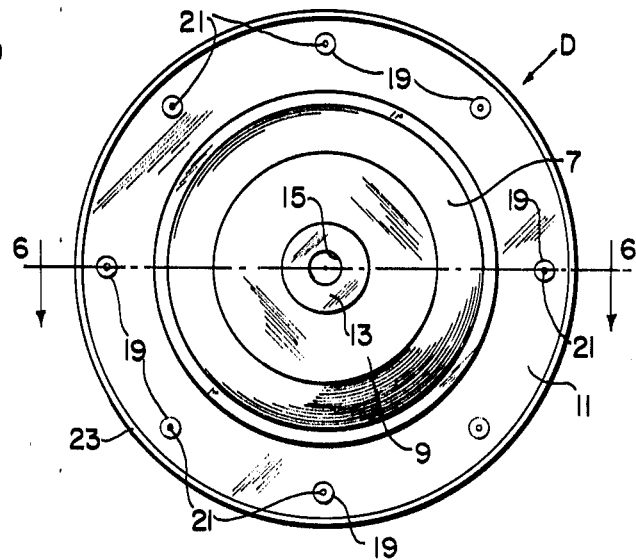
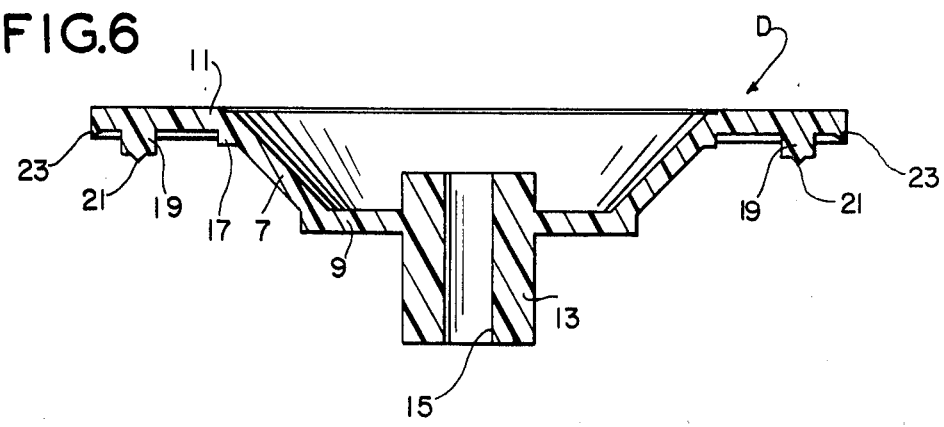

Oct. 5, 1971   W. H. HOLZBOOG   3,610,061
IDLER DRIVE WHEEL AND THE METHOD OF ITS MANUFACTURE
Filed May 14, 1970   3 Sheets-Sheet 3

United States Patent Office 3,610,061
Patented Oct. 5, 1971

3,610,061
IDLER DRIVE WHEEL AND THE METHOD OF ITS MANUFACTURE
Walter H. Holzboog, Olivette, Mo., assignor to Design International, Inc., St. Louis, Mo.
Filed May 14, 1970, Ser. No. 37,266
Int. Cl. B21d *53/26;* B23k *1/06;* F16h *55/34*
U.S. Cl. 74—215            11 Claims

ABSTRACT OF THE DISCLOSURE

An annular premolded elastomeric ring is formed with a rim of comparatively thick rectangular cross section and a perforated inward flange. A driving ring of a thermoplastic material is formed as a cone with an integral sleeve forming a bearing at the smaller end of the cone and an integral radial flange at its larger end. Between the radial flange and the cone is an annular step. Outside of the step the radial flange carries on its inner face axially directed integral drive fingers which extend through the perforations in the flange of the elastomeric ring. Flat ends of the fingers lie flush with the far side of the elastomeric flange but before final assembly carry central small conical protrusions therebeyond. Another flat thermoplastic clamping ring is formed with an internal axial flange having an axial slip fit around the step. An inner small peripheral axially directed circular bead before assembly extends from this internal axial flange. The elastomeric ring is sandwiched between the plastic rings. Upon final assembly under axial application of pressure and ultrasonic vibrations the protrusions on the drive fingers of the driving ring spot weld to the clamping ring and the inner peripheral bead of the clamping ring circularly welds to the driving ring around said step. The circular weld lies within the ambit of the spot-welded drive fingers. Each of the driving and clamping rings is also formed with small edgewise annular beads for gripping (without welding) on the opposite outer parts of the central elastomeric flange of the driving ring. This occurs outside of the ambit of the spot-welded driving fingers and with minimum distortion of the outermost portion of the rectangular section of its elastomeric outer rim. Finally the outer circular face of the latter is shaped by grinding to form a stepped circularly accurate thin cylindrical friction driving edge from which flashing occasioned by its premolding is removed.

BACKGROUND OF THE INVENTION

Former idler wheels of the general class to which the invention applies in particular, namely drives for record player turntables, have had elastomeric rims vulcanized on a disk in which was centrally staked a sintered metal oil-impregnated bearing hub. Marginal perforations in the disk admitted some of the vulcanized material. Vulcanization to the disk was costly and tended to deform the shape of the applied elastomeric rim. Moreover, the all-metal disk excessively transmitted noise from the driving mechanism through to the turntable, resulting in undesirable rumbling, chattering and like background noise undesirably transmitted to the pick-up head and speaker of a record being played.

SUMMARY OF THE INVENTION

By means of two ultrasonically welded low-cost, thermoplastic disks holding the elastomeric rim, a highly accurate idler wheel for turntable drives may be made rapidly in quantity providing for better quality of sound production by record players employing them. Other objects and features will be in part apparent and in part pointed out hereinafter. The record player parts employing the new wheel are not shown, being well-known in the art.

BRIEF DESCRIPTION OF THE DRAWINGS

FIG. 4 is a cross section taken on line 4—4 of FIG. 1;
FIG. 5 is an inner plan view of a driving ring;
FIG. 6 is a cross section taken on line 6—6 of FIG. 5.

FIGS. 1–3, 5, 7 and 9 are to one scale and FIGS. 4, 6, 8 and 10 are to a larger scale. The actual diameter of the disk disclosed is two inches from which preferred proportions of all parts may be substantially ascertained. Corresponding reference characters indicate corresponding parts throughout the several views of the drawings.

DESCRIPTION OF THE PREFERRED EMBODIMENT

Figure 7:
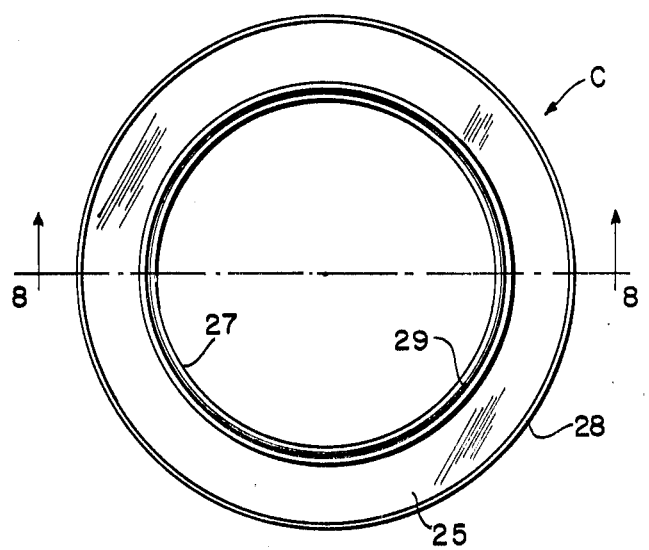
FIG. 7 is an inner plan view of a clamping ring.
Figure 8:
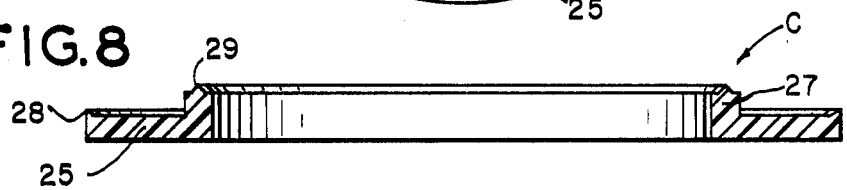
FIG. 8 is a cross section taken on line 8—8 of FIG. 7.
Figure 9:
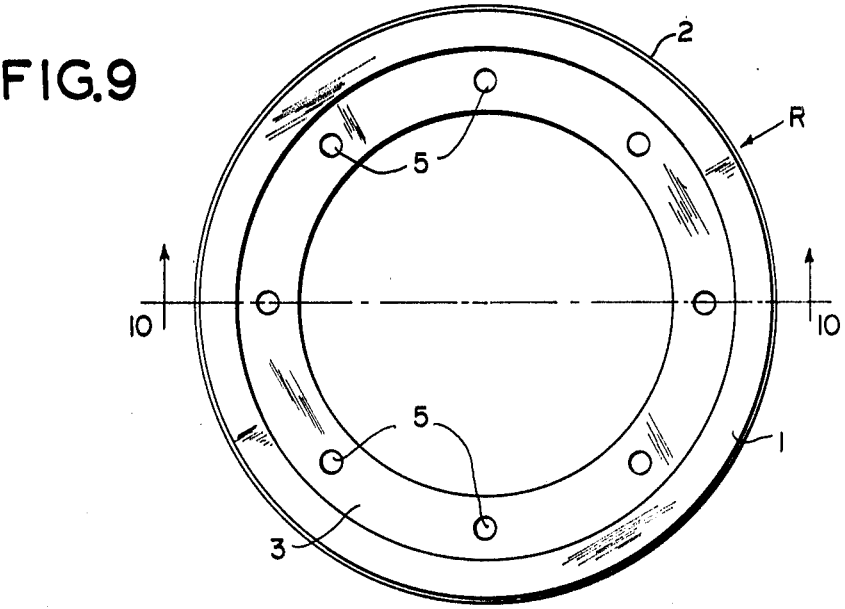
FIG. 9 is a plan of an elastomeric friction ring.

Referring now to the drawings, the assembled idler wheel of the invention is indicated generally at W in FIGS. 1–4. It comprises an elastomeric annular ring R (FIGS. 9 and 10); a conical molded plastic driving disk D (FIGS. 5 and 6) and a molded plastic clamping disk C (FIGS. 7 and 8). The elastomer may be rubber, neoprene or the like. The plastic should have good lubricity when set, soften by heating and set when cooled, for molding each part D and C and for forming ultrasonic welds therebetween, as described below. An appropriate plastic is nylon, a well-known duPont Company product. Another is Delrin, also a duPont Company product, which is an acetal resin. Another is Celcon, a product of the Celanese Corporation, which is an ethyl cellulose. All are thermoplastic so as to be moldable and when set are characterized by high impact strength, stiffness and good lubricity. They are also easy flowing for convenient molding and subsequent ultrasonic welding.

The meaning of the phrase "ultrasonic welding" is generally known in the art. In general (for example) 115 volt, 60 c.p.s. current is converted to 20,000 c.p.s. high freqeuncy electrical energy which, through an appropriate piezoelectric converter element, transforms the high frequency electrical energy to mechanical energy of high frequency vibration at 20,000 c.p.s. This energy is transmitted through an applied member, often called a horn, for transmission through the stiff plastic (as set when cool) to any desired thermoplastic joint contact area where frictional heat will be produced by the vibrations to melt the plastic momentarily (within a second or so) causing fusion which immediately upon cooling sets up to form a weld. Full details of apparatus and parameters for such welding is available from the Branson Sonic Power Company of Danbury, Conn. In general, for low-power, high-speed operations the initial interfacial contact areas where welds are to be made should be small, although the resulting welded areas may become larger by spreading over the interface desired to be welded. This contributes to low cost.

Figure 1:
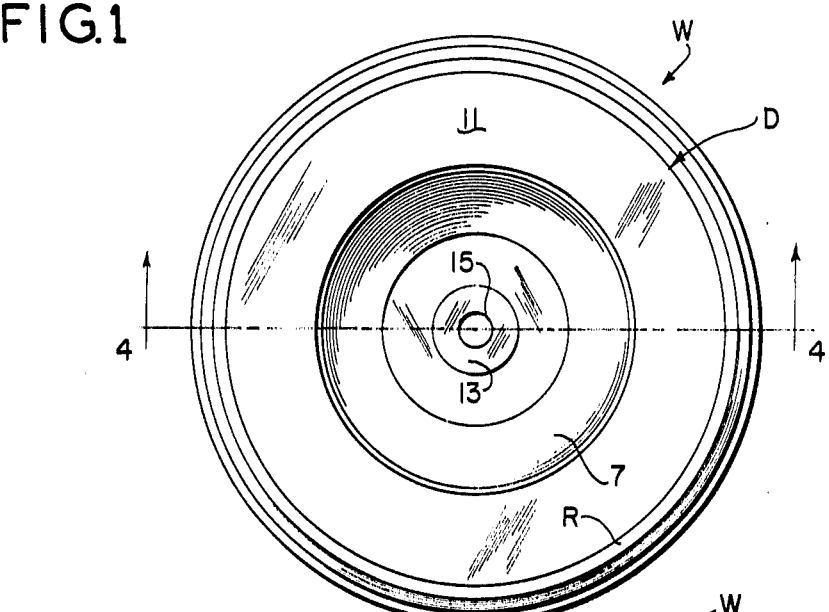
FIG. 1 is a top plan view of a complete idler wheel made according to this invention.
Figure 2:
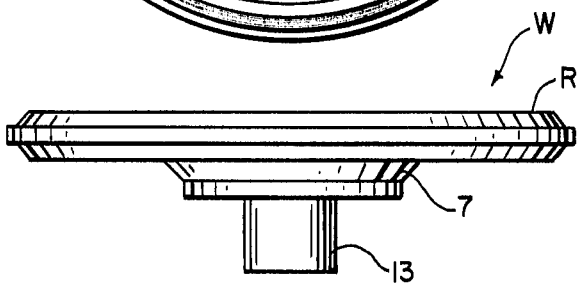
FIG. 2 is an edge view of the wheel.
Figure 3:
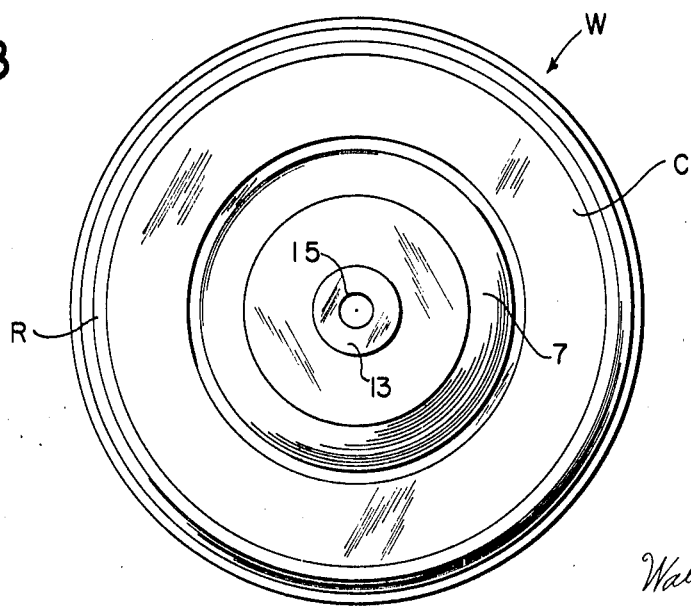
FIG. 3 is a bottom plan view.

Referring first to FIGS. 1–3, the entire finished assembly of the idler drive wheel is shown at W. This comprises the driving disk D, the clamping disk C and the elastomeric ring R, above referred to.

Figure 10:
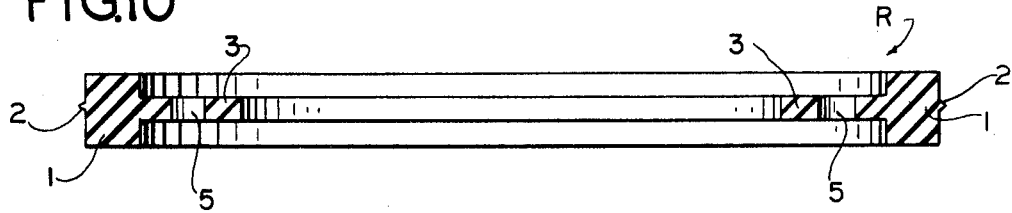
FIG. 10 is a cross section taken on line 10—10 of FIG. 9.

The detailed construction of the premolded elastomeric ing R ready for assembly but before final finishing consists of a rectangular margin of rectangular cross section as shown at 1 on FIG. 10. In the middle plane of this ring R there extends an inward flange 3 in which is a circular array of eight holes 5. The elastomeric material of which the ring R is composed may, for example, be rubber, neoprene or the like, as above stated. As conventionally premolded it has a small peripheral flashing shown at 2.

Details of the driving ring D are shown in FIGS. 5 and 6. These consist of a disk-like configuration having a conical portion 7 at the small end of which is a small radial flange 9 and at the large end of which is a large radial flange 11. At the center of the flange 9 is a hub 13 through which is a hole 15 to form a bearing which is of good lubricity in view of the nature of the thermoplastic material of which the disk D is composed.

The flange 11 is connected with the conical portion 7 by means of a shoulder or step 17. Surrounding the step 17 is a circular array of eight fingers 19 located so as to be insertable through the openings 5 in the ring R. Their lengths to their flat ends are approximately equal to the depths of the holes 5. At the end of each finger 19 is a small sharp projection 21. Extending from the rim of the flange 11 is a small sharp bead 23. Thus the protrusions 21 are in a spaced circular array and the protrusion 23 is of continuous circular form. Their extensions from the surfaces from which they arise are only a few thousandths of an inch as, for example, .005 inch.

Referring to the clamping disk C shown in FIGS. 7 and 8, it comprises a radial flange 25 and an axial flange 27. Around the edge of the flange 25 is a small raised sharp circular protrusion 28 (like the protrusion 23 on the edge of disk D). On the end of the axial flange 27 is a similar circular sharp protrusion 29. The heights of all of the protrusions are on the same order, namely, several thousandths of an inch. The inside diameter of the axial flange 27 is approximately equal to the outside diameter of the step 17 so that a close axial slip fit may be made to occur between them.

In FIG. 4 is shown a cross section of the wheel as assembled. Thus the premolded elastomeric ring R is sandwiched between the premolded driving ring D and the premolded clamping ring C. The arrangement is such that the fingers 19 extend through the holes 5 in the flange 3 with the axial flange 27 of ring C having a slip fit on the outside of the step 17. Also, the outside diameter of the axial flange 27 fits closely within the inside diameter of the inside flange 3 of the elastomeric ring R.

At the FIG. 5 and 6 stage, but not in FIG. 4, the projections 21 and the circular protrusion 29 exist. The next stage is to press together the disks C and D so that the protrusions 23 and 27 bite slightly into the inside portion of the originally rectangular margin 1 of the elastomeric ring R. The final bite is slight, so that undue marginal stresses and strains in this ring are minimized. Pressing means is illustrated diagrammatically by the dot-dash lines U. These illustrate surfaces of appropriate so-called horn parts of squeezing apparatus which through either or both of them apply ultrasonic vibrations to one or both of the flanges 11 and 25. These high-frequency vibrations (on the order of 20,000 c.p.s.) when they reach projections 21 and the circular protrusion 29 rapidly heat these by reason of concentrated vibratory friction at their sharp squeezed ends or edges. The melting point of the plastic is thus quickly reached under the said condition (in about one second or so), so that the melted materials of the localized ends of projections 21 and edge of the ring extension 29 melt locally and spread out flatly so as to weld together the first and second rings D and C, with the fingers 19 extending flush through the holes 5 in the elastomeric rinng R. Simultaneously, the raised portions 23 and 28 on the rings D and C effect the above-mentioned slight bite into the inner portion of the outside margin of the elastomeric ring R without welding. In view of what has been said, it is apparent that the application of the ultrasonic vibration may be stopped after a second or so, at which time the welding between parts C and D has been completed. The very heavy short horizontal black lines on FIG. 4 indicate where the heating, spreading and the welding have occurred.

Fabrication is completed by reshaping, by grinding, the initially rectangular marginal portion 1 of the elastomeric ring R as shown in FIG. 4. Unlike prior drive wheels of this type, the sides are not simply tapered to the outside driving margin. Instead, the sides, as shown at 31, are by the grinding stepped and tapered and the driving edge 33 formed while the bearing is rotated on an arbor. This removes the flashing 2 and presents the edge 33 as a rectangular bead. As a result the circular protrusion of which this edge 33 is the outline will be more nearly perfectly circular, as desired.

In view of the above, it will be seen that the several objects of the invention are achieved and other advantageous results attained.

As various changes could be made in the above constructions and methods withiut departing from the scope of the invention, it is intended that all matter contained in the above description or shown in the accompanying drawings shall be interpreted as illustrative and not in a limiting sense.

What is claimed is:

1. An idler drive wheel, comprising a central premolded elastomeric ring sandwiched between first and second individually premolded rigid thermoplastic rings;
   each of said rigid thermoplastic rings having means extending toward and contacting the other by means adapted to drive and hold the elastomeric ring within the confines of its periphery;
   the thermoplastic rings being welded to one another at each area of contact therebetween.

2. An idler drive wheel according to claim 1, wherein said elastomeric ring is formed with a comparatively thick outer rim and a comparatively thin centrally located and inwardly directed flange through which extend a circular array of holes;
   wherein the first one of said thermoplastic rings comprises an inner radial flange supporting a hub forming a bearing, and another part thereof forms an outer radial flange carrying fingers which extend through said holes in the elastomeric ring respectively with welding tips thereon;
   said second ring comprising an outer radial flange and an inner axial flange carrying a small circular bead, said axial flange telescoping a stepped portion on the other first ring, said welding tips on the fingers being ultrasonically welded to the outer radial flange of the second ring and said bead on the axial flange of the second ring also being ultrasonically welded to the first ring.

3. An idler wheel according to claim 2, wherein the outer radial flange on said first ring has a small axial marginal bead surrounding said array of fingers, and said radial flange of the second ring has an axially directed bead, said last-named axially directed beads effecting small penetrations to grip on the opposite inside portions extending from said thick outer rim of the elastomeric ring with minimal distortions at its outer margin.

4. An idler wheel according to claim 3, in which said last-named axially directed beads are of substantially equal diameters.

5. A drive wheel according to claim 3, wherein the inside and outside radial flanges of the first ring are connected by a conical shape.

6. A drive wheel according to claim 5, wherein said rim of the elastomeric ring is comparatively thick where squeezed by said beads on its inside and being ground to a comparatively thin configuration on its outside, while removing any flashing occasioned by its premolding.

7. A drive wheel according to claim 6, wherein the thermoplastic material of said sandwiching rings is of the high-impact, stiff variety for rapid elastomeric welding and strength, said thermoplastic material being selected from the group consisting of nylon, acetal resin and ethyl cellulose.

8. The method of manufacturing an idler drive wheel comprising:
   premolding an elastomeric ring to take a form having a circular margin and an inwardly directed radial flange which has a circular array of holes therethrough;
   premolding a thermoplastic driving disk to take a form when set having a central bearing hub and an outer radial flange connected with said hub, a circular array of fingers extending from the radial flange, said fingers having small end projections formed of diameters to fit into the holes in said elastomeric ring, said driving disk being formed with a margin which encircles the fingers;
   premolding a clamping disk to take a form when set having a radial flange connected with an inner axial flange and having a circular margin;
   forcing together the thermoplastic driving and clamping rings with the elastomeric ring sandwiched therebetween, the fingers of the driving ring extending through the holes in the elastomeric ring with the projections of said fingers contacting the radial flange of the clamping ring, the inner axial flange of the clamping ring contacting the driving ring within the array of said fingers, with said marginal portions of both rings around the fingers engaging the inner portion of the margin of the elastomeric ring; and
   applying ultrasonic vibrations to at least one of the driving and clamping rings while in contact, whereby the interfacial contacts between the fingers of the driving ring and the clamping ring, and the circular interfacial contacts between the clamping and driving rings melt and weld together the thermoplastic rings while the outer rims on both rings squeeze the inner portion of the outer rim of the elastomeric ring.

9. The method of manufacturing an idler drive wheel comprising:
   premolding an elastomeric ring to take a form having a circular comparatively thick margin and a central comparatively thin inwardly directed radial flange which has a circular array of holes therethrough;
   premolding a thermoplastic driving disk to take a form when set having a central bearing hub and an outer radial flange connected with said hub by a conical shape including a shoulder part within a circular array of fingers extending from the radial flange to fit said holes, said fingers terminating in small central protrusions, said driving disk being formed with a small peripheral bead on its margin encircling and extending in the direction of said fingers;
   premolding a clamping disk to take a form when set having a radial flange connected with an inner axial flange, said axial flange having an inner diameter to slip fit around said shoulder, said inner axial flange having a circular bead thereon, the outer margin of each of said radial flanges of the disks being formed with small protruding peripheral beads adapted to face one another;
   sandwiching the elastomeric ring between the thermoplastic driving and clamping rings and forcing them together, the fingers of the driving ring extending through the holes in the elastomeric ring with the protrusions of its fingers contacting the radial flange of the clamping ring, the bead on the axial flange of the clamping ring contacting the driving ring within the array of said fingers, with said margins of both rings around the fingers engaging the inner portion of the margin of the elastomeric ring; and
   squeezing the thermoplastic rings together with the elastomeric ring therebetween while applying ultrasonic vibrations to at least one of the thermoplastic rings while in contact, whereby the interfacial contacts between the protrusions of the fingers on the one hand and the contacts between the bead on the clamping ring melt and spread to weld together the thermoplastic rings while the outer peripheral beads on the rings squeeze the inner portion of the outer rim of the elastomeric ring.

10. The method according to claim 9 including the step of grinding the exterior portions of the elastomeric ring to remove any flashing which might have occurred during its molding, and forming lateral steps during grinding so as to present the outermost rim of the elastomeric ring as a substantially parallel-sided bead.

11. The method according to claim 9 wherein the ultrasonic vibration is approximately 20,000 c.p.s.

References Cited
UNITED STATES PATENTS

| | | | |
|---|---|---|---|
| 2,781,667 | 2/1957 | Giskes | 74—214 X |
| 3,133,449 | 5/1964 | Van Antwerp et al. | 74—216 |
| 3,168,773 | 2/1965 | Frye | 74—215 X |

LEONARD H. GERIN, Primary Examiner

U.S. Cl. X.R.

29—159; 228—1